United States Patent [19]

Komatsu

[11] Patent Number: 4,717,198
[45] Date of Patent: Jan. 5, 1988

[54] FRONT STRUCTURE OF VEHICLE BODY
[75] Inventor: Nobuhiro Komatsu, Hiroshima, Japan
[73] Assignee: Mazda Motor Corporation, Japan
[21] Appl. No.: 912,066
[22] Filed: Sep. 26, 1986
[30] Foreign Application Priority Data
  Sep. 30, 1985 [JP] Japan .......................... 60-150744[U]
[51] Int. Cl.⁴ .............................................. B62D 25/08
[52] U.S. Cl. ...................................... 296/192; 296/194
[58] Field of Search ................. 296/194, 192, 185, 188
[56] References Cited
  U.S. PATENT DOCUMENTS
  4,406,343  9/1983  Harasaki ............................. 296/194
  4,542,934  9/1985  Komatsu et al. ..................... 296/194
  FOREIGN PATENT DOCUMENTS
  57-11174  1/1982  Japan ................................... 296/192
  57-197369  6/1982  Japan .
  59-11976  1/1984  Japan ................................... 296/194

Primary Examiner—Robert R. Song
Attorney, Agent, or Firm—Gerald J. Ferguson, Jr.; Michael P. Hoffman; Michael J. Foycik, Jr.

[57] ABSTRACT

In an open cowl type front structure for a vehicle body in which a dashboard upper panel and a cowl panel are connected together so that an opening is formed to open upward in front of the cowl panel, the dashboard upper panel is provided on the front end thereof with a vertically extending front wall portion. The front wall portion defines, together with an upper portion of a dashboard lower panel separating an engine room and a passenger compartment, a closed cross-section portion extending in the transverse direction of the vehicle body. The closed cross-section portion is connected to right and left wheel aprons at opposite ends thereof.

16 Claims, 5 Drawing Figures

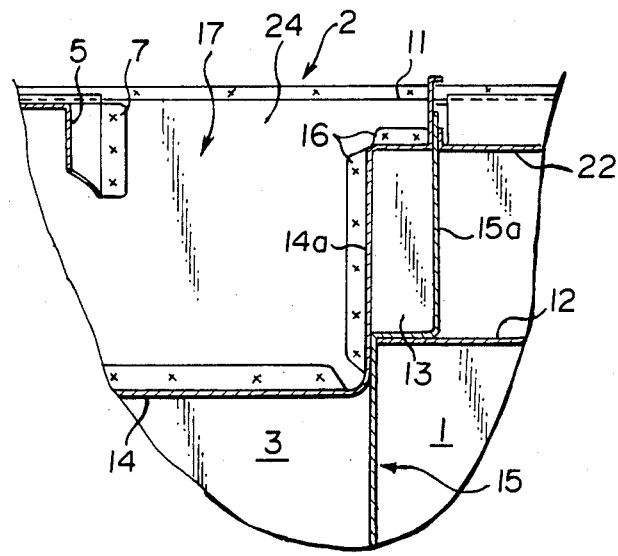
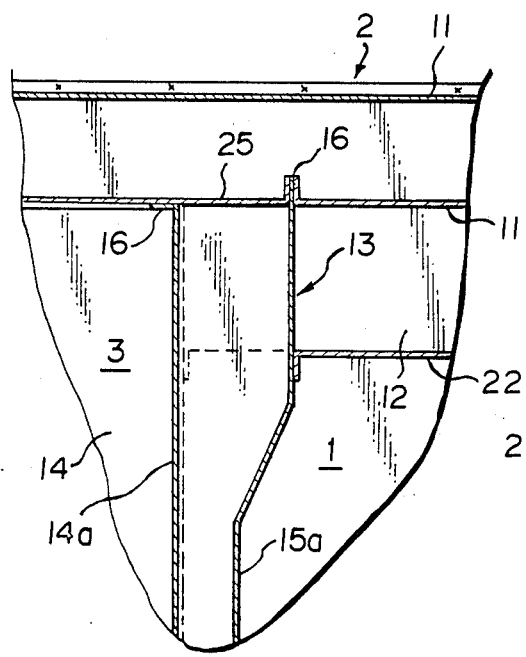

FRONT STRUCTURE OF VEHICLE BODY

BACKGROUND OF THE INVENTION

1. Field of the Invention

This invention relates to a front structure of a vehicle body, and more particularly to an open-cowl type front structure of a vehicle body in which a dashboard upper panel and a cowl panel are connected together to form an opening in front of the cowl panel.

2. Description of the Prior Art

In order to house wipers below the hood as in a concealed wiper or a semi-concealed wiper, or in order to form an air inlet for introducing air into the passenger compartment, there is generally employed an open cowl structure in which an opening is formed to open upward in front of the cowl panel.

For example, in Japanese Unexamined Utility Model Publication NO. 57(1982)-197369, there is disclosed an open cowl structure in which an air box for housing a wiper driving motor, an air filter and the like is formed by a dashboard lower panel for separating the engine room and the passenger compartment and a dashboard upper panel L-shaped in cross section and provided with a bent front wall portion by extending the dashboard lower panel near the inner surface of the hood and connecting the bend front wall portion to the dashboard lower panel, the air box being opened upward.

Further, there has also been put into practice an open cowl structure in which a wide U-shaped dashboard upper panel is connected on the rear side of the upper end portion of a dashboard lower panel and a cowl plate is disposed to cover the rear two thirds portion of the open upper end of the dashboard upper panel, thereby forming an air box upwardly opening at the front portion thereof by the dashboard upper panel and the cowl plate.

However such conventional open cowl structure is disadvantageous in that the cross member connecting together the right and left wheel aprons and connecting together the right and left front pillars is weak in rigidity and strength because of its open cross section structure, the upper end portion of the dashboard lower panel is apt to be deformed or buckle because of its free upper edge portion, and it is difficult to reinforce the connection between each of the right and left ends of the upper portion of the dashboard lower panel and the corresponding wheel apron.

SUMMARY OF THE INVENTION

In view of the foregoing observations and description, the primary object of the present invention is to provide a front structure for a vehicle body in which the difficulties or disadvantages inherent to the conventional front structures can be avoided.

In accordance with the present invention, there is provided an open cowl type front structure for a vehicle body in which a dashboard upper panel and a cowl panel are connected together so that an opening is formed to open upward in front of the cowl panel characterized in that the dashboard upper panel is provided on the front end thereof with a vertically extending front wall portion which defines, together with an upper portion of a dashboard upper panel separating an engine room and a passenger compartment, a closed cross-section portion extending in the transverse direction of the vehicle body, and the closed cross-section portion is connected to right and left wheel aprons at opposite ends thereof, the right and left wheel aprons defining the right and left side walls of the engine room.

With this arrangement, the cross member comprising the dashboard upper panel, the dashboard lower panel and the like is increased in rigidity and strength and the connection of the cross member with each wheel apron is reinforced. Further, since the upper end portion of the dashboard lower panel which is inherently a free end in the open cowl type structure is reinforced with the closed cross-section portion, the rigidity of the dashboard lower panel is increased and membrane vibration of the same is restrained.

BRIEF DESCRIPTION OF THE DRAWINGS

FIG. 3 is a cross-sectional view taken along line III—III in FIG. 1, FIG. 4 is a cross-sectional view taken along line IV—IV in FIG. 1, and FIG. 5 is a cross-sectional view taken along line V—V in FIG. 1.

DESCRIPTION OF THE PREFERRED EMBODIMENT

Figure 1:
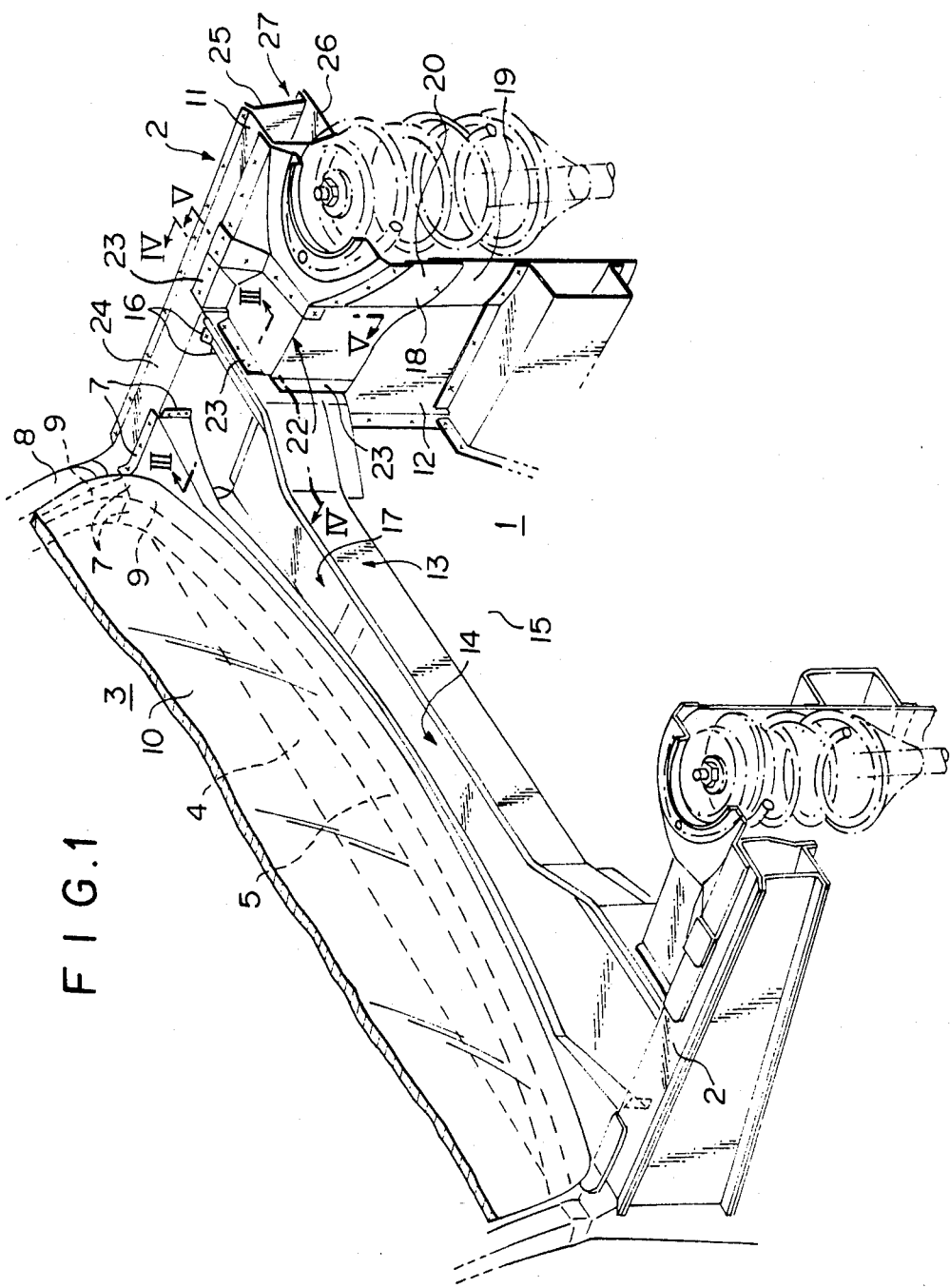
FIG. 1 is a fragmentary perspective view partly broken away showing a part of a vehicle provided with a front structure in accordance with an embodiment of the present invention.
Figure 2:
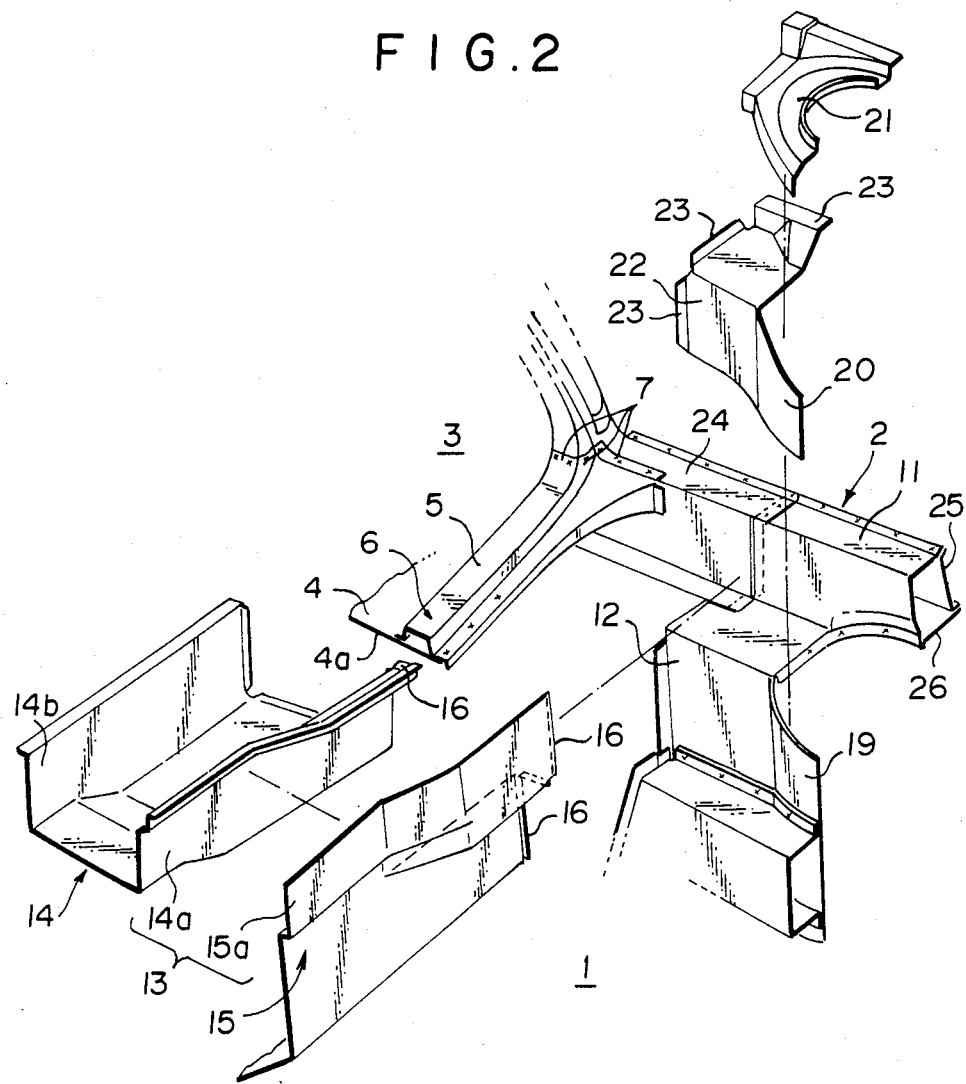
FIG. 2 is an exploded view of a part of the vehicle shown in FIG. 1.

In FIGS. 1 and 2, a front structure in accordance with an embodiment of the present invention includes right and left wheel aprons 2 respectively defining right and left side walls of an engine room 1. Each of the aprons 2 comprises an upper portion 11, a lower portion 12 and a rear portion 24. The upper portion 11 comprises a closed cross-section portion 27 which is defined by a wheel apron reinforcement upper 25 and a wheel apron reinforcement lower 26 to extend in the longitudinal direction of the vehicle body. A dashboard lower panel 15 for separating the engine room 1 and the passenger compartment 3 extends between the right and left wheel aprons 2 and is connected thereto at opposite ends. The rear portion 24 of each wheel apron 2 is connected to the lower end portion of a front pillar 8.

A channel-shaped dashboard upper panel 14 having a bottom wall, a front wall 14a and a rear wall 14b is disposed behind the upper end portion of the dashboard lower panel 15 and is connected to the inner faces of the right and left wheel aprons 2 at opposite ends. The dashboard upper panel 14 opens upward and the rear two thirds portion of the open end of the dashboard upper panel 14 is covered with a cowl panel 4. The cowl panel 4 is connected to the upper end of the rear wall 14b of the dashboard upper panel 14 and is connected to the right and left wheel aprons 2 at opposite ends.

An opening 17 extending substantially over the entire width of the vehicle body is defined in the front edge of the cowl panel 4 and the front wall 14a of the dashboard upper panel 14. That is, an open cowl structure is formed.

The inner space of the dashboard upper panel 14 functions as an air box.

The following measures are taken in order to sufficiently reinforce the open cowl structure, and in order to reinforce a cross member for connecting together the right and left wheel aprons 2 and connecting together the lower end portions of the right and left front pillars 8.

As shown in FIGS. 1 to 3, the front wall 14a of the dashboard upper panel 14 is cranked forward at a portion near the upper end thereof, and the dashboard lower panel 15 is cranked forward at the upper end portion 15a thereof. The portion of the front wall 14a of the dashboard upper panel 14 near the upper end and the portion of the dashboard lower panel 15 are welded together, and a portion of the front wall 14a near the lower end thereof and the dashboard lower panel 15 are welded together. Thus, a closed cross-section portion 13 extending substantially over the entire width of the vehicle body is formed by the front wall 14a of the dashboard upper panel 14 and the dashboard lower panel 15. The right and left ends of the closed cross-section portion 13 are respectively connected to the closed cross-section portions 27 of the right and left wheel aprons 2 at the upper portions 11.

In order to reinforce the connection between each end of the closed cross-section portion 13 and the corresponding wheel apron 2, the closed cross-section portion 13 is enlarged in cross section at the portion opposed to the upper part of the lower portion 12 of the wheel apron 2 by bending forward the upper end portion 15a of the dashboard lower panel 15 as clearly shown in FIG. 4.

A reinforcement 5 is mounted on the upper surface of the cowl panel 4 along the front edge of the cowl panel 4 slightly spaced therefrom. The reinforcement 5 is a channel member opening downward and is provided with mounting flanges on the lower ends of the front and rear walls. The reinforcement 5 is fixed to the cowl panel 4 by welding the flanges to the cowl panel 4. Thus, a closed cross-section portion 6 is formed by the reinforcement 5 and the cowl panel 4. Each of the right and left ends of the reinforcement 5 is connected to the corresponding front pillar 8 and the rear portion 24 of the corresponding wheel apron 2.

A windshield mounting face 9 for mounting a windshield 10 is formed on the front wall of the reinforcement 5 defining the front side of the closed cross-section portion 6 and on the inner side of the front surface of each of the right and left front pillars 8. The lower surface of the windshield 10 is supported on the mounting face 9 on the reinforcement 5.

In order to reinforce connection between the closed cross-section portion 6 and the rear portion 24 of the wheel apron 2, the front wall of the reinforcement 5 is diverged away from the rear wall near the ends thereof so that the width of the reinforcement is gradually increased toward the ends.

In order to reinforce connections between the rear portion 24 of the wheel apron 2, the closed cross-section portion 13, a suspension tower 18 and the lower portion 12 of the wheel apron 2, the following arrangement is employed.

As shown in FIGS. 1, 2 and 6, the suspension tower 18 comprises a lower case 19 formed by recessing the lower portion 12 of the wheel apron 2, an upper case 20 mounted on the upper portion of the lower case 19, and a cover 21 closing the open upper end of the upper case 20.

A reinforcement panel 22 of an L-shape in cross-section extends behind the upper case 20. By fixing mounting flanges 23 formed on the corresponding edges of the reinforcement panel 22 to the front face of the dashboard lower panel 15 and the upper portion 11 of the wheel apron 2, a closed cross-section structure is formed by the reinforcement panel 22, the upper portion 11 of the wheel apron 2 and the lower portion 12 of the wheel apron 2.

With the arrangement described above, the cross member formed by the dashboard upper panel 14, the dashboard lower panel 15 and the cowl panel 4 is reinforced with the closed cross-section portions 6 and 13.

Further, the cowl panel 4 is sufficiently reinforced with the reinforcement 5 to carry the load from the windshield 10.

Further, since the upper end portion of the dashboard lower panel 15 is reinforced with the closed cross-section portion 13, rigidity and strength of the dashboard lower panel 15 are increased and membrane vibration of the dashboard lower panel 15 is restrained.

Further, connections between the upper portion 11 of the wheel apron 2, the closed cross-section portion 13, the suspension tower 18 and the lower portion 12 of the wheel apron 2 can be substantially strengthened by the reinforcement panel 22.

I claim:

1. An open cowl type front structure for a vehicle body comprising a dashboard upper panel, the dashboard upper panel including an upwardly open channel member, the dashboard upper panel and a cowl panel being connected together so that an opening is formed to open upward in front of the cowl panel, the dashboard upper panel being provided on the front end thereof with a vertically extending front wall portion which defines, together with an upper portion of the dashboard lower panel separating an engine room and a passenger compartment, a closed cross-section portion extending in the transverse direction of the vehicle body, and the closed cross-section portion being connected to right and left wheel aprons at opposite ends thereof, the right and left wheel aprons defining the right and left side walls of the engine room.

2. An open cowl type front structure as defined in claim 1 in which each end portion of said closed cross-section portion is connected to a wheel apron reinforcement which has a closed cross-section and extends in the longitudinal direction of the vehicle body.

3. An open cowl type front structure as defined in claim 2 in which said closed cross-section portion is connected to a suspension tower in front of the closed cross-section portion by a reinforcement panel.

4. An open cowl type front structure as defined in claim 3 in which said reinforcement panel defines a closed cross section together with each wheel apron.

5. An open cowl type front structure as defined in claim 4 in which said closed cross-section portion is provided with a widened portion at each end, and the reinforcement panel is connected to the corresponding widened portion of the closed cross-section portion.

6. An open cowl type front structure as defined in claim 2 in which said closed cross-section portion is provided with a widened portion at each end.

7. An open cowl type front structure as defined in claim 2 in which a reinforcement is connected to said cowl panel to form a closed cross-section portion for supporting a windshield, the closed cross-section portion extending in the transverse direction of the vehicle body and being connected to right and left front pillars at opposite ends.

8. An open cowl type front structure as defined in claim 7 in which said reinforcement is provided with a widened portion at each end and is connected to the corresponding wheel apron at the widened portion.

9. An open cowl type front structure for a vehicle body comprising a dashboard lower panel formed by a board-like member separating an engine room and a passenger compartment and extending in the transverse direction of the vehicle body, and a cowl box having an upwardly opening U-like cross-section and extending in the transverse direction of the vehicle body, said cowl box being located at the upper end of the dashboard lower panel, a closed cross-section portion extending in the transverse direction of the vehicle body, said closed cross-section portion being formed at a front wall portion of the cowl box vertically extending at the front end portion thereof, and opposite ends of said closed cross-section portion being respectively connected to right and left wheel aprons respectively defining right and left side walls of the engine room.

10. An open cowl type front structure for a vehicle body comprising a dashboard lower panel formed by a board-like member separating an engine room and a passenger compartment and extending in the transverse direction of the vehicle body, and a cowl box having an upwardly opening U-like cross-section and extending in the transverse direction of the vehicle body, said cowl box being located at the upper end of the dashboard lower panel, a closed cross-section portion extending in the transverse direction of the vehicle body, said closed cross-section portion being formed at a front wall portion of the cowl box vertically extending at the front end portion thereof, and opposite ends of said closed cross-section portion being respectively connected to right and left wheel aprons respectively defining right and left side walls of the engine room in which said closed cross-section portion is formed by the front wall portion of said cowl box and a panel member connected to said front wall portion, said panel member extending in the transverse direction of the vehicle body.

11. An open cowl type front structure as claimed in claim 10 in which the front wall portion of said cowl box is formed by an upwardly extending upper end portion of said dashboard lower panel.

12. An open cowl type front structure as claimed in claim 10 in which said cowl box is a member having a U-shaped cross-section.

13. An open cowl type front structure as claimed in claim 10 in which said closed cross-section portion is connected to a suspension tower which is disposed in front of the closed cross-section portion by a reinforcement panel.

14. An open cowl type front structure as claimed in claim 13 in which said reinforcement panel forms a closed cross-section together with each wheel apron.

15. An open cowl type front structure as claimed in claim 10 further comprising a reinforcement means connected to said cowl panel to form a reinforcing closed cross-section portion for supporting a windshield, the reinforcing closed cross-section portion extending in the transverse direction of the vehicle body and being connected to right and left front pillars at opposite ends thereof.

16. An open cowl type front structure as claimed in claim 15 in which said reinforcement means has a widened portion at each end thereof and is connected to the corresponding wheel apron at the widened portion.

* * * * *